J. H. KING, Jr.
Hand-Seeder.

No 11,611.  Patented Aug. 29, 1854.

UNITED STATES PATENT OFFICE.

JOHN H. KING, JR., OF GEORGETOWN, DISTRICT OF COLUMBIA.

IMPROVEMENT IN SEED-PLANTERS.

Specification forming part of Letters Patent No. 11,611, dated August 29, 1854.

*To all whom it may concern:*

Be it known that I, JOHN H. KING, Jr., of Georgetown, in the county of Washington and District of Columbia, have invented a new and useful Improvement in Seeding-Machines; and I do hereby declare that the following is a full, clear, and exact description of the construction and operation of the same, reference being had to the annexed drawings, forming part of this specification, in which—

Figure 1:
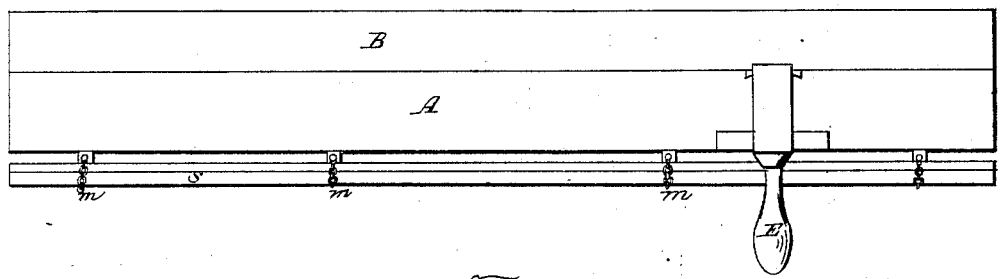
Figure 2:
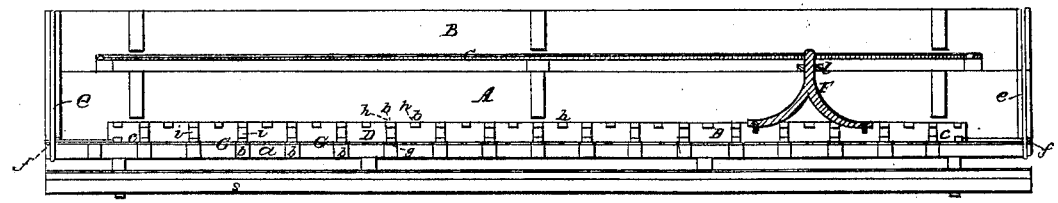
Figure 3:
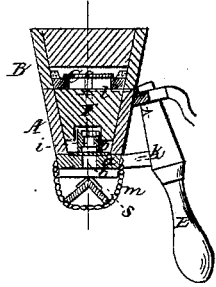
Figure 4:
Figure 5:
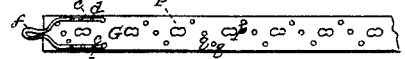

Figure 1 is a side elevation of the machine. Fig. 2 is a vertical longitudinal section of same on line $xx$ of Fig. 3. Fig. 3 is a cross-section of the machine, taken on line $yy$ of Fig. 1. Fig. 4 is a top view of a portion of the agitator. Fig. 5 is a top view of a portion of the distributing-gage.

Similar characters of reference denote the same parts.

My invention consists in the use of an adjustable scatterer placed below the hopper for insuring, as will be described, the even distribution of the seed and manure.

To enable others skilled in the art to make and use my invention, I will proceed to describe its construction and operation.

In the drawings, A is the hopper, constructed of the form shown in Fig. 3.

In the bottom $a$ of the hopper are the outlets $b$, over which is secured the zinc gage G, having, as shown in Fig. 5, perforations of different sizes suited to the various grain, seed, or manures intended to pass through them. This gage is secured in the desired position by placing the hooks $c$ in such of the holes $d$ as will bring the required perforations over the discharging-openings $b$, the hooks being held in position by the pin $e$ passing through the eye $f$.

Above the gage G is the agitator D, (shown in Fig. 4,) having in both upper and lower surfaces the grooves $g$ and $h$, the grooves $h$ being double the number of the grooves $g$, and with perforations $i$ running through it from top to bottom. The agitator is moved by means of the lever E, which has its fulcrum at $k$, and the branch $l$ of which is fastened to the standard F. This standard is securely fastened to the agitator, as shown in Fig. 2, by screws through its base.

Below the hopper A, and held by the chains $m$, is the scatterer S, formed of two pieces hinged at top, as shown in Fig. 3, so that the inclination of the sides can be varied at the pleasure of the operator, as and for the purposes hereinafter to be described.

The operation of my improved seeder is as follows: The gage G is first adjusted to the nature of the seed or manure to be deposited, by placing the holes $p$ over the outlets for large grain, and one or more of the holes $q$ over them, according to the quantity of small seed or manure required to be sown to the acre. This adjustment is simply accomplished by removing the pins $e$ from eyes $f$, withdrawing the hooks $c$ from the holes $d$, and moving the gage on the bottom of the hopper to the desired position, when it is again secured by inserting the points of the hooks $c$ in the holes $d$ and the pins $e$ in the eyes $f$. The second adjustment is that of the scatterer S, the sides of which are more or less inclined according to the violence of the wind, a calm day requiring the scatterer to be nearly flat and a windy day requiring a great inclination. Various manures, however, require different inclinations of the scatterer to properly distribute them without clogging. Having thus completed the adjustments, which it will be observed are of the simplest nature, the hopper A is filled with the required grain or seed, and held by a strap in front of the farmer, who, as he advances, moves the lever E from side to side, giving the screen C and agitator D a reciprocating motion, causing the seed to pass through the outlets $b$ to the scatterer, from which it distributes itself evenly over the surface of the ground. If it be desired to sow a double quantity of seed, the face of the scatterer containing the grooves $h$ is placed downward, which produces the desired effect. The adjustable scatterer serves to evenly distribute the seed and manure over the surface of the ground under the various circumstances to which the sowing may be subjected, as herein fully described.

I do not claim solid scatterers such as are used in the lime-spreader of I. Hatch, patented August 17, 1835, and also shown in the rejected application of M. D. Wells. Neither do I lay any claim to the use of sieves or screens above the hopper A, as shown in the drawings; but What I do claim as new and of my own invention, and desire to secure by Letters Patent, is—

The employment of the adjustable scatterer S, as described, for insuring the even distribution of the various seed and manures passed through the apparatus, as herein fully set forth.

In testimony whereof I have hereunto signed my name before two subscribing witnesses.

JOHN H. KING, JR.

Witnesses:
GEO. PATTEN,
SAML. GRUBB.